Dec. 22, 1942.   A. MÜLLER   2,305,810
REGULATING DEVICE FOR HEIGHT AIRCRAFT ENGINES WITH TWO COMPRESSORS
Filed Feb. 3, 1939
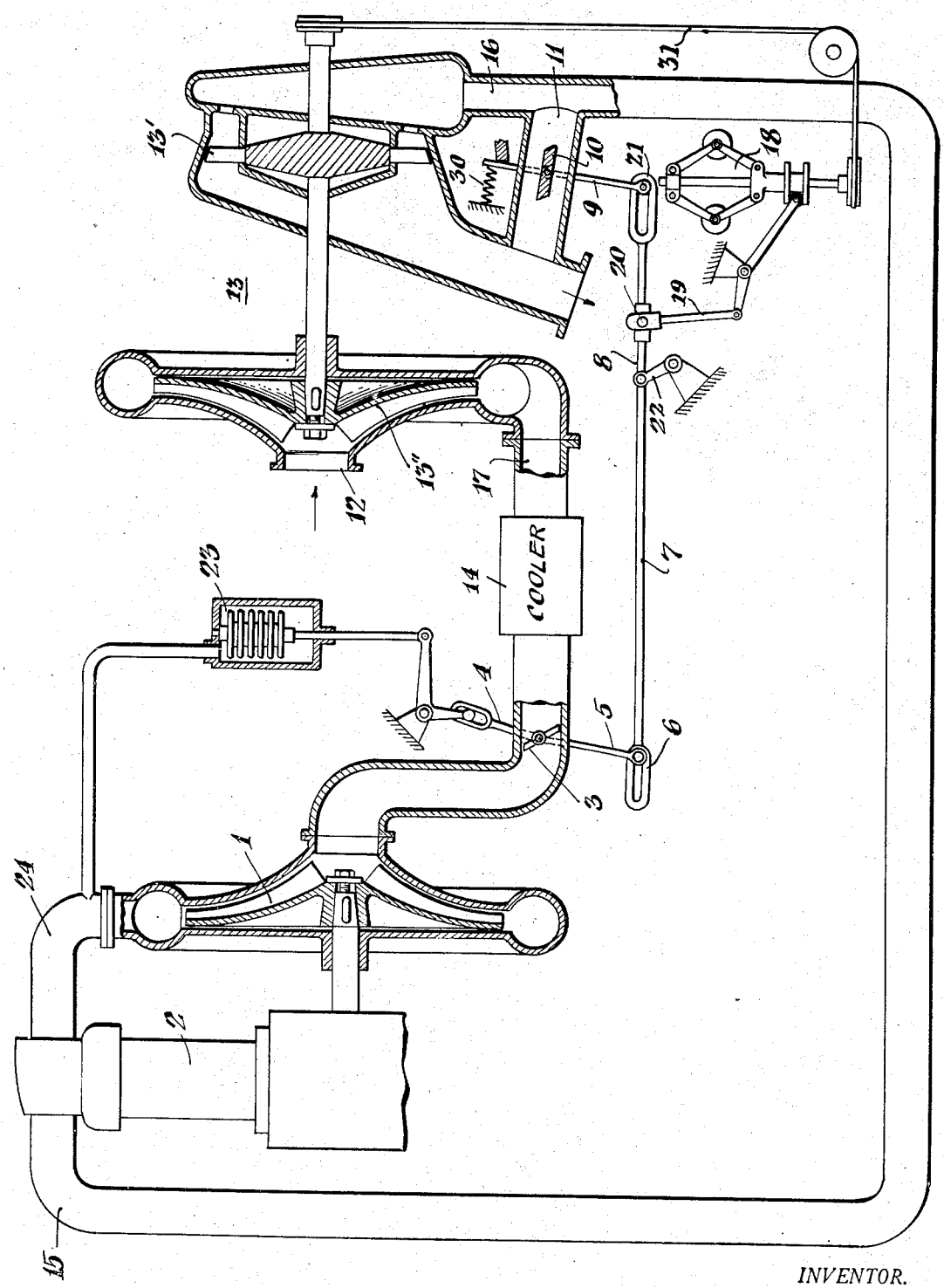
INVENTOR.
Alfred Müller
BY
ATTORNEY Patented Dec. 22, 1942

2,305,810

UNITED STATES PATENT OFFICE 2,305,810

REGULATING DEVICE FOR HEIGHT AIRCRAFT ENGINES WITH TWO COMPRESSORS

Alfred Müller, Munich, Germany; vested in the Alien Property Custodian

Application February 3, 1939, Serial No. 254,425 In Germany December 12, 1937

8 Claims. (Cl. 60—13)

With a set of exhaust gas turbo-superchargers for charging an aircraft engine it is well known that the output of the exhaust gas turbine rises as the counterpressure of the atmosphere becomes lower with the increasing height of flight, since the useful pressure drop becomes greater. Further the automatic regulation of the exhaust gas turbine by means of a regulator responsive to charging pressure is known, wherein the exhaust gases are utilised more or less for impinging upon the turbine according to the output required at any time, or are alternately exhausted into the atmosphere.

For more effectively utilizing an exhaust gas turbine, as is the case of flights at considerable altitude, it has already been proposed to operate the exhaust gas turbine only after a considerable altitude has been reached, and up to this altitude to compress the charging air for the internal combustion engine by means of supercharger driven mechanically from the crankshaft of the engine.

The invention is based on an arrangement wherein there is provided a supercharger driven by an exhaust gas turbine, and a supercharger driven mechanically from the crankshaft of the engine, and the object of the invention is to provide an automatic regulation of the two ranges of the charging pressure, that is to say, both of the range of charging pressure produced by the supercharger driven mechanically from the engine, and the range of charging pressure wherein both superchargers together produce the necessary pressure, in as simple a way as possible.

For carrying the idea of the invention, the regulating linkage is so constructed that it enables automatic regulation to be effected both of the supercharger driven by the exhaust gas turbine as also of the supercharger constantly driven by the engine, automatically in accordance with one regulator responsive to charging pressure.

Through the automatic regulation of two separately driven superchargers by a common regulating device, a properly timed sequential operation of each supercharger is assured.

With the foregoing and other objects in view which will appear as the description proceeds, the invention resides in the combination and arrangement of parts and in the details of construction hereinafter described and claimed.

In the accompanying drawing:

The single figure shows diagrammatically the complete arrangement and the construction of the regulating mechanism.

As seen from the drawing, the invention has been applied to a radial type aircraft engine in which a supercharger 1, which may be termed a "ground supercharger," is constantly drivably connected by any suitable means to an engine partially diagrammatically indicated at 2. Accordingly, air under pressure is constantly supplied from the supercharger 1 to the cylinders of the engine 2 through a suitable conduit 24, while the air supply to the supercharger 1 is controlled by a throttle valve 3, here illustrated as being of the "butterfly" type. The valve 3 is in turn actuated by a lever 4 in a manner to be described hereinafter. Through a second lever 5 slidably connected in the slotted guide 6 on one end of the rod 7, which is in turn pivotally connected to the rod 8 acting upon subsidiary connecting lever 9, the valve 3 is interconnected with a throttle valve 10 which controls the flow of the engine exhaust gases through the exhaust by-pass pipe 11.

The flow of charging air for the engine 2 may be traced from the air intake 12 and supercharger 13", forming part of an exhaust gas turbo-supercharger combination 13, conduit 17, a cooling device 14, the supercharger 1 and then through conduits 24 to the engine cylinders. Obviously, if only the supercharger 1 is running, the air therefor will be merely drawn through the supercharger 13" and the cooling device 14, whereas if the exhaust gas turbo-supercharger 13 is also running, the air reaching the supercharger 1 will be under an initial compression.

The exhaust gases for driving the turbo-supercharger 13 are shown as gathered in a collecting ring diagrammatically indicated at 15 which is interconnected with the turbine 13' through suitable means such as a pipe 16. It will be clear to those skilled in this art that actuation of the turbo-supercharger 13 will depend upon the movement and positioning of the exhaust gas throttle 10. If the throttle 10 is in such a position that the exhaust gases may be discharged into the open through the by-pass pipe 11, the turbo-supercharger 13 will not be actuated since the pipe 11 will offer a minimum resistance to the flow of the exhaust gases, which will accordingly then pass out into the atmosphere. However, as the valve 10 is closed the exhaust gases will flow through the pipe 16 to drive the turbine 13' which will then compress the air sucked in from the air intake pipe 12 and supply such charged air to the supercharger 1 through the conduit 17 and the cooling device 14. The latter tends to remove some of the heat caused by the compression of the air by the supercharger 13''.

As a safety precaution, the turbo-supercharger 13 drives a speed-responsive device 18 of any suitable, well-known character, through suitable means such as the belt drive 31. The speed-responsive device acts through the rod 19 upon a hinged joint 20 in the rod 8 to permit movement of the throttle 10 toward its open position under the action of the spring 30, whenever the maximum safe speed of the turbo-supercharger 13 has been exceeded. The collapsing of the rod 8 due to the action of the speed-responsive device 18, will not, however, affect the movement of the valve 3 of the supercharger 1 because of the play afforded by the slotted guide 6. Unless the safe speed of the turbo-supercharger 13 has been exceeded, the rod 8 will act as straight stiff link.

Particular attention is directed to the linkage system interconnecting the valves 3 and 10, which is in the form of a lost-motion connection. As previously described, the rod 7 is interconnected with the lever 5 for the valve 3 through a slotted guide 6; similarly, the rod 8 is interconnected with the lever 9 for the valve 10 through a second slotted guide 21. The rods 7 and 8 are pivotally connected with one another upon the end of a rocker arm 22. Actuation of the linkage system for control of the valves 3 and 10 may be effected either by suitable manual means under the control of the pilot or through a pressure-responsive device indicated at 23 and interconnected with the linkage system, as, for example, through the control lever 4. The pressure-responsive device 23 is preferably responsive, as shown, to the pressure in the conduit 24 in front of the engine, and may take the form of any suitable pressure-responsive actuating mechanism such, for example, as the well-known metallic bellows disclosed in the British Patent 450,587. Since the final object of this invention is to control the supply of charged air to the engine in response to the altitude of the aeroplane, the regulating device 23 might also be responsive to atmospheric pressure. While the control of the valve 5 has been illustrated as directly actuated by the pressure-responsive device, as is well known in the art an indirect servo-control could be used just as well.

The aforedescribed apparatus will operate in the following manner:

At low altitude, the ground supercharger 1 which is constantly driven by the engine, will supply a certain amount of air under pressure to the cylinder of the engine 2, depending upon the setting of the valve 3. At this time the valve 10 will be held in such a position by suitable means such as a spring 30, that the exhaust gases collected in the ring 15 will pass outwardly through the by-pass pipe 11 and the turbo-supercharger 13 will therefore not be actuated. The air for the ground charger 1 is therefore sucked through the air intake 12, passes through the supercharger 13'', conduit 17, the cooling device 14 and then over the valve 3 to the supercharger 1. As the aeroplane rises, the pressure-responsive device 23 will act to open the valve 3 to a greater degree until a certain predetermined maximum supply of air is available to the supercharger 1. Movement of the valve 3 at this time will not, however, actuate the exhaust valve 10. Although the lever 5 will press against the right end of the slot 6 to push the rod 7 to the right, the slot 21 in the interconnected rod 8 will prevent movement of the valve actuating lever 9. After a predetermined angular movement of the valve 3, however, the rods 7 and 8 will have moved to such an extent that the left end of the slotted guide 21 will press against the end of the lever 9, so that any further movement of the valve 3 will actuate the lever 9 to close the exhaust valve 10. Any hunting due to the resulting increased pressure upon the device 23, and thus reverse movement of the valve 3 will not affect the link rods 7 and 8 since the valve 3 may move reversely in the slotted guide 6 without affecting the position of the link rod. As the aeroplane descends, a reverse action will take place, the turbo-supercharger first being disconnected and the valve 3 gradually closing. If the turbo-supercharger 13 tends to run at excessive speed, it will be controlled by the speed-responsive device in the manner heretofore described.

It will accordingly be seen that I have provided an arrangement whereby the ground supercharger and the turbo-supercharger, serially connected, are controlled by a single pressure-responsive device in a manner which permits most efficient operation of an aeroplane engine throughout various altitudes of flight. The system has the advantage of extreme simplicity and, at the same time, has the further advantage that the turbo-supercharger is only used where necessary, thus preventing excessive use of this device which always operates under considerable stress and as a result has been a constant source of trouble and expense.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

I claim:

1. In combination, an internal combustion engine, a first supercharger driven thereby, a conduit for supplying air under pressure from said first supercharger to said internal combustion engine, a second supercharger, means for guiding air from said second supercharger to said first supercharger, an exhaust turbine drivably connected to said second supercharger, means for guiding the exhaust gases from said internal combustion engine to said exhaust turbine, a throttle valve in said air guiding means for controlling the flow of air to said first supercharger, means in said exhaust gas guiding means for controlling the flow of said gases to said exhaust turbine, a linkage system interconnecting said throttle valve and exhaust gas controlling means, and a pressure-responsive device for actuating said linkage system.

2. The combination according to claim 1, in which said linkage system includes a lost motion connection permitting partial movement of said throttle valve without accompanying movement of said exhaust gas controlling means.

3. The combination according to claim 1, in which said linkage system includes a pair of links pivotally connected together at their inner end and having slotted guides at their outer end, and crank arms on said throttle valve and exhaust gas controlling means respectively engaging said slotted guides.

4. The combination according to claim 1, in combination with means responsive to a predetermined speed of said exhaust turbine, and means actuated by said speed-responsive means for controlling said exhaust gas controlling means independently of said valve.

5. In an internal combustion engine for aeroplanes adapted to be supplied with air under pressure by two serially connected superchargers, one of which is driven by the engine and the other by a turbine actuated by the exhaust gases of the engine, the combination of a rotatable valve for controlling the supply of air to the supercharger driven by the engine, means responsive to the change in pressure resulting from a change in altitude of said aeroplane for controlling said valve, means for controlling the supply of exhaust gases to said turbine, and a lost motion linkage interconnecting said valve and said exhaust gas controlling means, whereby the latter is only moved after a predetermined angular rotation of said valve.

6. The combination according to claim 5, in which said linkage includes a rocker-arm mounted for pivotal movement, a pair of links connected together at their inner end on said rocker-arm and having slotted guides at their outer end, and crank arms on said rotary valve and exhaust gas controlling means respectively engaging said slotted guides.

7. The combination according to claim 5, in which said linkage includes a rocker-arm mounted for pivotal movement, a pair of links pivotally connected together at their inner end on said rocker-arm and having slotted guides at their outer end, crank arms on said rotary valve and exhaust gas controlling means respectively engaging said slotted guides, the link between said rocker-arm and said exhaust gas controlling means being formed as a hinged collapsible rod, means responsive to the speed of said exhaust turbine, and a rod actuated by said speed-responsive means and pivotally interconnected to the hinged portion of said rod for varying the exhaust gas controlling means.

8. In combination, an internal combustion engine for aeroplanes, a first supercharger driven thereby, a charging conduit for supplying air under pressure from said first supercharger to said internal combustion engine, a second supercharger, means for guiding air from said second supercharger to said first supercharger, an exhaust turbine drivably connected to said second supercharger, means for guiding the exhaust gases from said internal combustion engine to said exhaust turbine, a rotatable valve in said air guiding means for controlling the flow of air to said first supercharger, means in said exhaust gas guiding means for controlling the flow of gases to said exhaust turbine, a lost-motion linkage interconnecting said valve and said exhaust gas controlling means, whereby the latter is only moved after a predetermined angular rotation of said valve, and means responsive to the pressure in said charging conduit for rotating said valve and through said linkage and exhaust gas control means to maintain a uniform pressure in the charging conduit in front of the engine.

ALFRED MÜLLER.